United States Patent [19]

Ikemoto et al.

[11] Patent Number: 4,577,525

[45] Date of Patent: * Mar. 25, 1986

[54] GEAR ASSEMBLY FOR AUTOMOBILE TRANSMISSION

[75] Inventors: Kazuhito Ikemoto; Yukio Terakura; Takashi Miyake, all of Toyota, Japan

[73] Assignee: Toyota Jidosha Kabushiki Kaisha, Japan

[*] Notice: The portion of the term of this patent subsequent to Jul. 23, 2002 has been disclaimed.

[21] Appl. No.: 447,188

[22] Filed: Dec. 6, 1982

[30] Foreign Application Priority Data

Dec. 23, 1981 [JP] Japan ................................ 56-208530

[51] Int. Cl.⁴ ............................................. F16H 55/18
[52] U.S. Cl. ...................................... 74/440; 74/409
[58] Field of Search ................ 74/409, 339, 431, 432, 74/440, 443

[56] References Cited

U.S. PATENT DOCUMENTS

| | | | |
|---|---|---|---|
| 1,124,107 | 1/1915 | Bugatti | 74/409 |
| 1,619,799 | 3/1927 | Rounds et al. | 74/440 |
| 1,629,564 | 5/1927 | White | 74/440 |
| 2,663,198 | 12/1953 | Cairnes | 74/409 |
| 2,868,033 | 1/1959 | Gaither | 74/409 |
| 2,896,466 | 7/1959 | Wiseman | 74/409 |
| 2,966,806 | 1/1961 | Luning | 74/409 |
| 3,037,396 | 6/1962 | Martin | 74/409 |
| 3,093,007 | 6/1963 | Aebersold | 74/339 |
| 3,174,356 | 3/1965 | Michalec | 74/440 |
| 3,361,002 | 1/1968 | Staehlin | 74/440 |
| 3,373,625 | 3/1968 | Keller | 74/409 |
| 3,496,794 | 2/1970 | Forichon | 74/440 |
| 3,638,511 | 2/1972 | Kirschner | 74/440 |
| 3,995,498 | 12/1976 | Curchod et al. | 74/440 |

FOREIGN PATENT DOCUMENTS

| | | |
|---|---|---|
| 441835 | 3/1927 | Fed. Rep. of Germany . |
| 1921099 | 10/1970 | Fed. Rep. of Germany . |
| 2118126 | 11/1971 | Fed. Rep. of Germany . |
| 473246 | 1/1915 | France . |
| 1247385 | 10/1959 | France ................................ 74/339 |
| 44544 | 12/1973 | Japan . |
| 123479 | 2/1974 | Japan . |
| 856629 | 12/1960 | United Kingdom . |

Primary Examiner—Rodney H. Bonck
Assistant Examiner—David Novais
Attorney, Agent, or Firm—Parkhurst & Oliff

[57] ABSTRACT

A gear assembly for automobile transmissions includes a pair of driving and driven gears permanently in meshing engagement with each other to provide a torque transmission therebetween, and an additional gear relatively rotatable at one side of either one of the gears and being permanently in meshing engagement with the other gear to rotate at a gear ratio different from that of the driving and driven gears, and in which the additional gear is resiliently in contact with one end face of the gear adjacent thereto to restrain a relative rotation between the driving and driven gears. The toothed portion of the gear adjacent to the additional gear is formed at one end thereof with an annular stepped portion for provision of a predetermined annular gap between the additional gear and one end of the toothed portion of the gear.

3 Claims, 2 Drawing Figures

GEAR ASSEMBLY FOR AUTOMOBILE TRANSMISSION

BACKGROUND OF THE INVENTION

The present invention relates to an automobile gear transmission driven by an internal combustion engine, and more particularly to a gear assembly adapted to the gear transmission for eliminating gear knocking noises in operation.

As is well known, gear knocking noises occur in the gear transmission due to inevitable fluctuation of the engine rotation and backlash of the assembled gears. Such gear knocking noises occur most noticeably during idling of the engine when the gear transmission is in neutral. For the purpose of eliminating the gear knocking noises, a gear assembly has been proposed which includes a pair of driving and driven gears permanently in meshing engagement with each other to provide a torque transmission therebetween, and an additional gear relatively rotatable at one side of either one of the gears and being permanently in meshing engagement with the other gear to rotate at a gear ratio different from that of the driving and driven gears, and in which the additional gear is resiliently in contact with one end face of the gear adjacent thereto to restrain a relative rotation between the driving and driven gears. In such a gear assembly as described, the additional gear does not act as a torque transmission gear. For this reason, the strength of the additional gear may be relatively low, while the additional gear is usually in contact with one end face of the toothed portion of the gear adjacent thereto. This results in unexpected defacement of the additional gear due to the presence of burrs on the toothed portion of the gear.

SUMMARY OF THE INVENTION

It is, therefore, a primary object of the present invention to provide an improved gear assembly capable of avoiding in a simple manner such unexpected defacement of the additional gear due to the presence of burrs on the toothed portion of the gear adjacent thereto.

According to the present invention there is provided an improved gear assembly of the type as described above in which the toothed portion of the gear adjacent to the additional gear is formed at one end thereof with an annular stepped portion for provision of a predetermined annular gap between the additional gear and one end face of the toothed portion of the gear adjacent thereto. Preferably, the driven gear is formed at one side thereof with a boss portion and at one end of its toothed portion with an annular stepped portion, and the additional gear is in the form of a plate-like gear which is axially slidable and rotatable on the boss portion of the driven gear and in meshing engagement with the driving gear to rotate at a gear ratio different from that of the driving and driven gears, the plate-like gear being resiliently in contact with the annular stepped portion of the driven gear and spaced from one end face of the toothed portion of the driven gear with the predetermined annular gap.

BRIEF DESCRIPTION OF THE DRAWING

Additional objects and advantages of the present invention will be more readily apparent from the following detailed description of a preferred embodiment thereof when taken together with the accompanying drawing in which.

DETAILED DESCRIPTION OF THE PREFERRED EMBODIMENT

Figure 1:
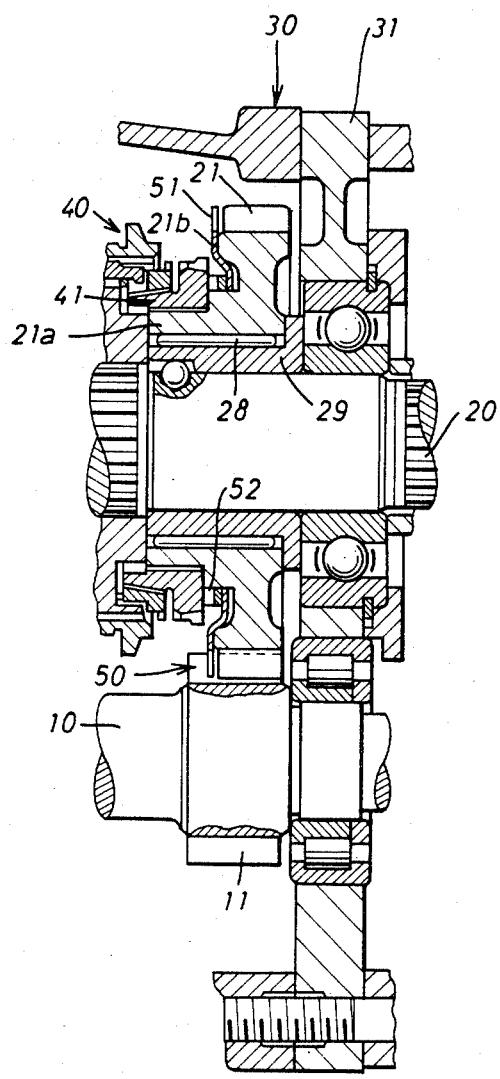
FIG. 1 is a sectional view of a gear assembly in accordance with the present invention.

Referring now to the drawing, FIG. 1 illustrates a gear assembly in accordance with the present invention which is adapted to a portion of an automobile gear transmission. The gear transmission includes a countershaft 10 and an output shaft 20 which are arranged in parallel with an input shaft (not shown) and rotatably supported from an intermediate plate 31 of a housing assembly 30 for the transmission. The countershaft 10 is arranged to receive an input torque thereon from an internal combustion engine by way of a clutch assembly, the input shaft and an input gear train (not shown). The countershaft 10 is provided thereon with a driving gear 11 which is permanently in meshing engagement with a driven gear 21 rotatable on the output shaft 20. The driven gear 21 is mounted on the output shaft 20 through a needle roller bearing 28 coupled over a collar 29. Arranged at the left side of driven gear 21 is a synchronizer mechanism 40, which acts in its shifted position to provide a torque transmission from the driven gear 21 to the output shaft 20. In such an arrangement, the driven gear 21 is integrally formed at its left side with a boss portion 21a to which a spline piece 41 is fixed with a press-fit.

Figure 2:
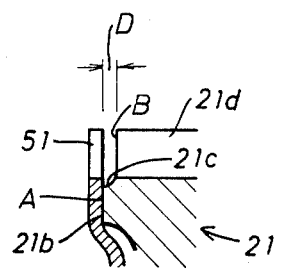
FIG. 2 is an enlarged sectional view showing a portion of the gear assembly of FIG. 1.

Assembled between the driven gear 21 and the spline piece 46 is an additional plate-like gear 51 the tooth number of which is different from that of the driven gear 21. The plate-like gear 51 in the form of a pressed sheet-metal is axially slidable and rotatable on the boss portion of driven gear 21 for relative rotation with the driven gear 21. The plate-like gear 51 is also permanently in meshing engagement with the driving gear 11 and resiliently in contact with the left end face 21b of driven gear 21 under a pressure of a wave-shaped ring spring 52 which is interposed between the plate-like gear 51 and the spline piece 41. Thus, the frictional engagement of plate-like gear 51 with the left end face 21b of driven gear 21 serves to eliminate knocking noises between gears 11 and 21, as described in detail later. As can be well seen in FIG. 2, the driven gear 21 is formed at its left side with an annular stepped portion 21c for provision of a predetermined annular gap D between the engagement face A of driven gear 21 with the plate-like gear 51 and the left end face B of the tooth portion 21d of driven gear 21.

In such a gear assembly as described above, the driven gear 21 and the additional plate-like gear 51 are driven by the driving gear 11 during rotation of the countershaft 10 to cause a relative rotation therebetween due to the difference in their tooth numbers of gear ratios related to the driving gear. This gives rise to a frictional force or drag torque at the engagement face A between driven gear 21 and plate-like gear 51. Under such operating condition, the drag torque acts to restrain a relative rotation between gears 11 and 21 caused by fluctuation of the engine rotation and backlash of the gears 11, 21 so as to eliminate knocking noises in operation of gears 11 and 21. Furthermore, it is noted that owing to provision of the predetermined annular gap D, unexpected defacement of the plate-like gear 51 does not occur in spite of the presence of burrs on the left end face B of the toothed portion 21d of gear 21. It is also noted that in the actual practice of the present invention the annular stepped portion 21c for gap D can be formed at a low cost during manufacturing process because of a relatively small area of the end face 21b to be finished in a precise manner.

Although a certain specific embodiment of the present invention has been illustrated and described, it is obvious that many modifications thereof are possible. The invention, therefore, is not intended to be restricted to the exact showing of the drawing and description thereof, but is considered to include reasonable and obvious equivalents.

What is claimed is:

1. In a gear assembly including having a pair of driving and driven gears permanently in meshing engagement with each other to provide a torque transmission therebetween, and an additional gear relatively rotatable at one side on a boss portion of either one of said gears and being permanently in meshing engagement with the other gear to rotate at a gear ratio different from that of said driving and driven gears, and in which said additional gear is resiliently in contact with a synchronizer mechanism assembled adjacent to said additional gear and having a spline piece fixed to the boss portion of said gear, and resilient means for resiliently pressing said additional gear against one end face of the gear adjacent thereto to restrain a relative rotation between said driving and driven gears, the improvement wherein a toothed portion of the gear adjacent to said additional gear is formed at one end thereof with an annular stepped portion for provision of a predetermined annular gap between said additional gear and the one end face of the toothed portion of the adjacent gear, and wherein said resilient means is a compression spring arranged in surrounding relationship with the boss portion of said gear and is engaged at its one end with said additional gear and at its other end with the spline piece of said synchronizer mechanism.

2. The gear assembly of claim 1, wherein said additional gear comprises a plate-like gear of pressed sheet metal.

3. In a gear assembly including having a pair of driving and driven gears permanently in meshing engagement with each other to provide a torque transmission therebetween, said driven gear being formed at one side thereof with a boss portion, and an additional gear axially slidable and rotatable on the boss portion of said driven gear and being permanently in meshing engagement with said driving gear to rotate at a gear ratio different from that of said driving and driven gears, and in which said additional gear is resiliently in contact with a synchronizer mechanism assembled adjacent to said additional gear and having a spline piece fixed to the boss portion of said driven gear, and resilient means for resiliently pressing said additional gear against one end face of said driven gear to restrain a relative rotation between said driving and driven gears.

the improvement wherein a toothed portion of said driven gear is formed at one end thereof with an annual stepped portion for provision of a predetermined annular gap between said additional gear and the one end face of the toothed portion of said driven gear, and wherein said resilient means is a waveshaped ring spring arranged in surrounding relationship with the boss portion of said driven gear and is engaged at its one end face with said additional gear and at its other end face with the spline piece of said synchronizer mechanism.

* * * * *